Patented Jan. 14, 1936

2,028,115

UNITED STATES PATENT OFFICE 2,028,115

DIBENZANTHRONE-AZOLE AND PROCESS OF PREPARING THE SAME

Alexander J. Wuertz, Carrollville, and Myron S. Whelen, Milwaukee, Wis., assignors to E. I. du Pont de Nemours & Company, Wilmington, Del., a corporation of Delaware No Drawing. Application April 29, 1933, Serial No. 668,622

16 Claims. (Cl. 260—44)

This invention relates to azole compounds of the dibenzanthrone series. It is an object of this invention to prepare novel compounds of the dibenzanthrone series which are useful as vat dyestuffs. Other and further objects of this invention will appear as the description proceeds.

The compounds with which this invention deals are characterized by possessing in their structure a dibenzanthrone nucleus which is substituted by both nitrogen and an element of the sulfur series, for instance, sulfur or selenium. The inorganic elements are very probably present in the form of an azole ring, since our novel compounds are formed by caustic fusion of benzanthrone-azoles such as benzanthrone-thiazoles, or benzanthrone selenazoles. It appears, however, that to a certain extent the azole ring decomposes during fusion. The structure of the dye-stuff cannot, therefore, be stated conclusively. Very probably it is a mixture of a dibenzanthrone-diazole and a dibenzanthrone-monoazole.

The products of this invention are grey to dark blue and black vat dyestuffs, depending on the particular substituent in the carbon atom of the azole ring, as well as on whatever other substituents may be present in the dibenzanthrone nucleus. They are prepared by caustic fusion of the benzanthrone-thiazoles and selenazoles described and claimed in our copending applications of even date, Ser. Nos. 668,620 and 668,621.

These benzanthrone-thiazoles and selenazoles are prepared by reducing an anthraquinone-1,2-thiazole (or corresponding selenazole) in concentrated sulfuric acid and reacting it in the sulfuric acid solution either simultaneously or subsequently with glycerine. The resulting benzanthrone-thiazole may be of a structure corresponding to any one of the following three formulas:

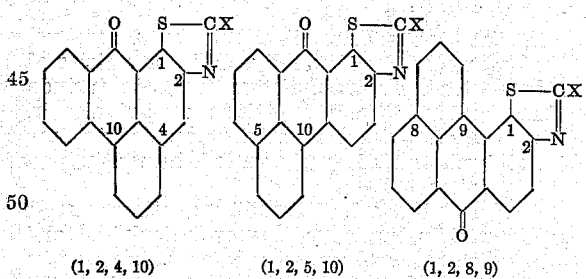

(1, 2, 4, 10)     (1, 2, 5, 10)     (1, 2, 8, 9)

It is uncertain, however, which one of the three is the correct formula, or whether indeed the product is not a mixture of the three or any two of them.

The selenazoles have the same general formula with selenium replacing sulfur.

The caustic fusion may be carried out along analogous lines with the known procedures for fusing benzanthrone to dibenzanthrone. For instance, caustic alkali, alcoholic caustic alkali, or aniline and caustic alkali mixtures may be employed. Oxidizing agents may be added. And the temperatures involved may vary within the same ranges as for the known caustic fusions of benzanthrone, which generally range from 100 to 225° C. It is better, however, to adhere to lower temperatures, in order to avoid excessive decomposition of the thiazole ring. 120–160° C. constitutes the preferred range of temperature. The fusion may also be conducted under conditions leading first to a dibenzanthronyl compound, such as 2,2'-dibenzanthronyl or Bz1,Bz1'-dibenzanthronyl, which may then be converted into a dibenzanthrone compound in known manner.

Without limiting our invention to any particular procedure, the following examples are given to illustrate our specific mode of operation. Parts given are by weight.

Example 1

10 parts of alcohol and 40 parts of potassium hydroxide are mixed and heated together to 130° C. At this temperature 10 parts of benzanthrone-1,2-phenyl-thiazole (Example 1 of copending application Ser. No. 668,620) are added and the whole is heated together at 175° C. until all the benzanthrone-1,2-phenyl-thiazole has disappeared. This usually takes about one hour. The dark blue melt is then diluted with about 800 parts of water, well mixed and heated to 80° C. 8.5 parts of sodium hydrosulfite are then added, and the whole is heated at 80–85° C. for half an hour, after which it is filtered. The filtrate is oxidized by blowing with air, and the dibenzanthrone body precipitated is filtered off, washed alkali free, acidified, washed free from acid with water, and dried.

The product so obtained is a blue-black powder, which on dissolving in concentrated sulfuric acid gives a reddish-violet color. It dyes cotton from a reddish-violet vat in grey to reddish-black shades. In constitution it is probably chiefly dibenzanthrone-diphenyl-dithiazole.

If the 10 parts of benzanthrone-1,2-phenyl-thiazole in this example are replaced by an equal weight of benzanthrone-1,2-phenyl-selenazole (Example 1 of copending application Ser. No. 668,621), a product of substantially identical appearance and properties is obtained. It dyes cotton in grey to black shades and probably consists chiefly of dibenzanthrone-diphenyl-diselenazole.

Example 2

10 parts of benzanthrone-1,2-phenyl-thiazole are added to an alcoholic potassium hydroxide melt, consisting of 25 parts of alcohol and 40 parts of potassium hydroxide at 120° C. The temperature is then slowly raised to 145° C. over about a half hour and this temperature is maintained for about two hours. The reaction product is worked up and the dyestuff isolated in a manner similar to that shown in Example 1.

Example 3

20 parts of alcohol and 40 parts of potassium hydroxide are mixed together and heated to 125° C. 10 parts of benzanthrone-1,2-phenyl-selenazole are then added and the mass is heated to 150° C. and maintained at this temperature until all of the benzanthrone compound has disappeared. The fusion mass is then worked up and the product formed isolated in a manner similar to that shown in Example 1.

Example 4

25 parts of potassium hydroxide are mixed with 50 parts of aniline and thereto are added 10 parts of benzanthrone-1,2-phenyl-thiazole. The mass is heated to 180–185° C. and this temperature maintained for several hours. It is then cooled to 100° C., filtered and washed with an organic solvent to remove aniline. The product so obtained is suspended in water and vatted with sodium hydroxide and sodium hydrosulfite. Insoluble materials are removed by filtration and the filtrate is oxidized with air. The dyestuff so precipitated is filtered off, washed free of alkali, acidified, washed free of acid and dried. It is a blue-black powder and appears to be identical with the product obtained in Examples 1 and 2.

In the above example, the benzanthrone-1,2-phenyl-thiazole may be added to the aniline-potash mix after the latter has been heated to 100° C.

Also, after the reaction is complete, the aniline may be removed by steam distillation, instead of filtration.

Example 5

6.6 parts of sodium are dissolved in 40 parts of alcohol and 80 parts of potassium hydroxide are added. The mass is heated together at 125° C. until fluid. At this temperature 15 parts of benzanthrone-1,2-phenyl-thiazole or selenazole are added and the mass is heated at 145–150° C. for one hour. The dibenzanthrone body so formed is then isolated as in Example 1.

Example 6

20 parts of alcohol and 50 parts of potassium hydroxide are heated together at 125° C. until a smooth melt is obtained. To this are added 10 parts of benzanthrone-1,2-thiazole (Example 3 of copending application Ser. No. 668,621) and the mass is heated at 140° C. for three hours. The dyestuff is isolated in a manner analogous to that shown in Example 1, and resembles the phenyl-thiazole product of Example 1 in general properties.

Example 7

30 parts of alcohol and 70 parts of caustic potash are heated together at 125° C. until a smooth melt is obtained. To this are added 10 parts of benzanthrone-1,2-selenazole (Example 3 of copending application Ser. No. 668,621). The fusion mass is then slowly heated to 145° C. and maintained at this temperature for about one hour. The dyestuff so formed is isolated in a manner similar to that shown in Example 1, and resembles the phenyl-selenazole compound therein obtained in general properties.

Example 8

20 parts of alcohol and 50 parts of potassium hydroxide are heated together at 125° C. until a smooth melt is obtained. To this are added 10 parts of benzanthrone-1,2-methyl-thiazole (Example 2 of copending application Ser. No. 668,620), and the mass is heated at 140° C. for three hours. The dyestuff formed is isolated in a manner analogous to that shown in Example 1. It resembles in properties the product of Example 1.

If in lieu of benzanthrone-1,2-methyl-thiazole in this example, an equal weight of benzanthrone-1,2-methyl-selenazole is used (Example 2 of copending application, Ser. No. 668,621), the corresponding methyl-selenazole derivative of dibenzanthrone is obtained. It is a black powder which dyes cotton from a reddish vat in blue-grey shades.

Example 9

10 parts of benzanthrone-1,2-β-anthraquinonyl-thiazole (Example 4 of copending application Ser. No. 668,620) are added to a melt consisting of 20 parts of alcohol and 50 parts of potassium hydroxide at 125° C. The temperature is then slowly raised to 150° C. and this temperature is maintained for about one hour. The dyestuff so formed is isolated in a manner analogous to that shown in the preceding examples. It is a blue-black powder, which dyes cotton from a reddish-violet vat in grey shades.

A similar compound is obtained if the benzanthrone-1,2-β-anthraquinonyl-thiazole above used is replaced by an equal weight of benzanthrone-1,2-β-anthraquinonyl-selenazole as obtained in Example 4 of copending application Ser. No. 668,621.

The new compounds above described are characterized by good stability toward various reagents, and may therefore be subjected to any of the usual operations for introducing substituents into dibenzanthrone, such as halogenation, oxidation, sulfonation, or oxidation followed by alkylation.

It will be understood that many variations and modifications are possible in our preferred mode of procedure, without departing from the spirit of this invention.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. A vat dyestuff of the dibenzanthrone-azole series, yielding upon cotton grey to dark blue and black dyeings, said dyestuff being obtainable by subjecting to alkali-fusion a compound of the group consisting of a benzanthrone-1,2-thiazole and a benzanthrone-1,2-selenazole.

2. A vat dyestuff comprising chiefly a dibenzanthrone-alpha, beta, alpha', beta' dithiazole.

3. A vat dyestuff comprised chiefly of dibenzanthrone-C—C'-diphenyl-alpha, beta, alpha', beta' dithiazole.

4. A dibenzanthrone-thiazole compound which in the dry state is a blue black powder which dissolves in concentrated sulfuric acid with a reddish violet color and dyes cotton from a reddish violet vat in gray to reddish black shades and which is obtainable by fusing a benzanthrone-1,2-C-phenyl-thiazole with potassium hydroxide and alcohol at temperatures between 100 and 225° C.

5. A vat dyestuff comprising chiefly a dibenzanthrone-alpha, beta, alpha', beta' diselenazole.

6. A vat dyestuff comprised chiefly of dibenzanthrone-C—C'-diphenyl-alpha, beta, alpha', beta' diselenazole.

7. A dibenzanthrone-selenazole compound which in the dry state is a blue black powder which dissolves in concentrated sulfuric acid with a reddish violet color and dyes cotton from a reddish violet vat in gray to reddish black shades and which is obtainable by fusing a benzanthrone-1,2-C-phenyl-selenazole with potassium hydroxide and alcohol at temperatures between 100 and 225° C.

8. The process of producing a vat dyestuff of the dibenzanthrone series, which comprises subjecting to alkali fusion a benzanthrone-azole of the series consisting of benzanthrone-alpha, beta-thiazoles and benzanthrone-alpha, beta-selenazoles in which the Bz1 position and the adjacent carbon atom in the anthraquinone nucleus contain no substituents.

9. The process of producing a vat dyestuff of the dibenzanthrone series which comprises subjecting to alkali fusion a benzanthrone-1,2-C-phenyl-thiazole in which the Bz1 position and the adjacent carbon atom in the anthraquinone nucleus contain no substituents.

10. The process of producing a vat dyestuff of the dibenzanthrone series which comprises fusing a benzanthrone-1,2-thiazole which contains no substituent in the Bz1 position and on the carbon atom adjacent thereto in the anthraquinone nucleus, with caustic alkali at a temperature between 100 and 225° C.

11. The process of producing a vat dyestuff of the dibenzanthrone series which comprises fusing a benzantrone-1,2-thiazole which contains no substituent in the Bz1 position and on the carbon atom adjacent thereto in the anthraquinone nucleus with alcoholic caustic alkali at a temperature between 120 and 160° C.

12. The process of producing a vat dyestuff of the dibenzanthrone series which comprises fusing benzanthrone-1,2-C-phenyl-thiazole with alcoholic caustic potash at a temperature between 120 and 160° C.

13. The process of producing a vat dyestuff of the dibenzanthrone series which comprises subjecting to alkali fusion a benzanthrone-1,2-C-phenyl-selenazole in which the Bz1 position and the adjacent carbon atom in the anthraquinone nucleus contain no substituents.

14. The process of producing a vat dyestuff of the dibenzanthrone series which comprises fusing a benzanthrone-1,2-selenazole which contains no substituent in the Bz1 position and on the carbon atom adjacent thereto in the anthraquinone nucleus with caustic alkali at a temperature between 100 and 225° C.

15. The process of producing a vat dyestuff of the dibenzanthrone series which comprises fusing a benzanthrone-1,2-selenazole which contains no substituent in the Bz1 position and on the carbon atom adjacent thereto in the anthraquinone nucleus with alcoholic caustic alkali at a temperature between 120 and 160° C.

16. The process of producing a vat dyestuff of the dibenzanthrone series which comprises fusing benzanthrone-1,2-C-phenyl-selenazole with alcoholic caustic potash at a temperature between 120 and 160° C.

ALEXANDER J. WUERTZ.
MYRON S. WHELEN.